United States Patent [19]

Slater

[11] 4,179,135
[45] Dec. 18, 1979

[54] MOTORCYCLE FRONT WHEEL SUSPENSION SYSTEM

[76] Inventor: John Slater, Hulme 6-C Escondido Vil., Stanford, Calif. 94305

[21] Appl. No.: 869,041

[22] Filed: Jan. 13, 1978

[51] Int. Cl.² .......................................... B62K 11/12
[52] U.S. Cl. ................................. 280/276; 280/660
[58] Field of Search ............... 280/276, 277, 278, 279, 280/280, 96.1, 263, 264, 270, 274, 275, 283, 660

[56] References Cited

U.S. PATENT DOCUMENTS

| | | | |
|---|---|---|---|
| 91,682 | 6/1869 | Smith | 280/276 |
| 205,134 | 10/1923 | Herds | 280/276 |
| 946,143 | 1/1910 | Levedahl | 280/276 |
| 1,320,282 | 10/1919 | Scott | 280/274 |
| 3,521,904 | 7/1970 | Sheffer | 280/279 |
| 3,883,152 | 5/1975 | deCarbon | 280/96.2 R |
| 4,037,855 | 7/1977 | Smith | 280/276 |
| 4,082,307 | 4/1978 | Tait | 280/277 |

OTHER PUBLICATIONS

*Cycle*, p. 19, 1978 issue.
*Bicycles and Tricycles*, by Sharp, MIT Press, 1977, pp. 296, 297.

Primary Examiner—Joseph F. Peters, Jr.
Assistant Examiner—John A. Carroll
Attorney, Agent, or Firm—Limbach, Limbach & Sutton

[57] ABSTRACT

A suspension system for the front wheel of a motorcycle wherein a fork that carries the front wheel is connected to the frame in a manner that the steering axis of the fork in response to front wheel deflection by bumps is displaced parallel to itself relative to the frame. A specific example of such a suspension mechanism is a double A-arm connection. Handlebars are rotatably mounted to the frame. A connection between the handlebars and the fork is made in a manner so only rotation of the handlebars will cause rotation of the fork about its steering axis, and the connection does not affect suspension movement of the wheel relative to the frame. Examples of the steering connection are a folding bar and a hydraulic system.

14 Claims, 4 Drawing Figures

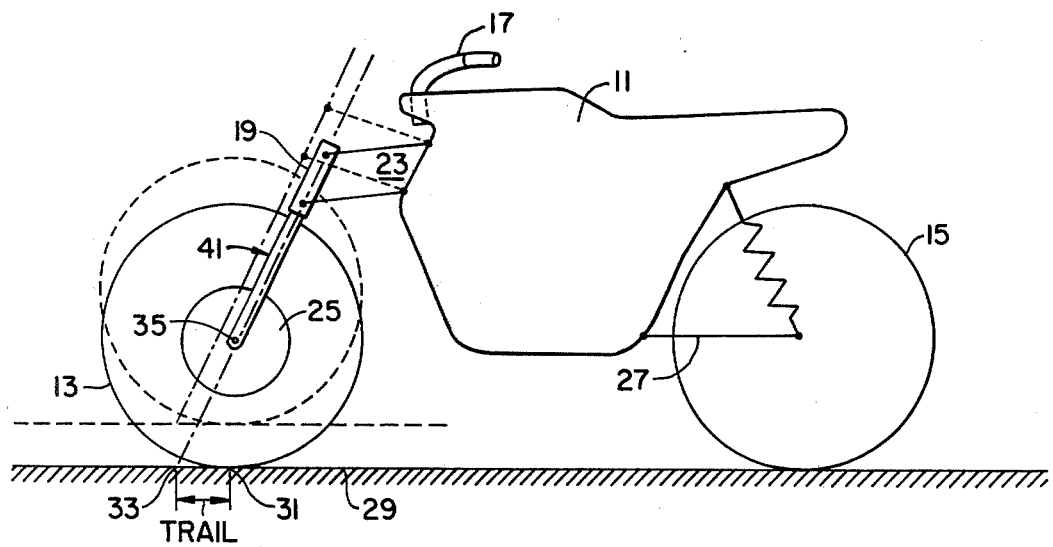
FIG._1.

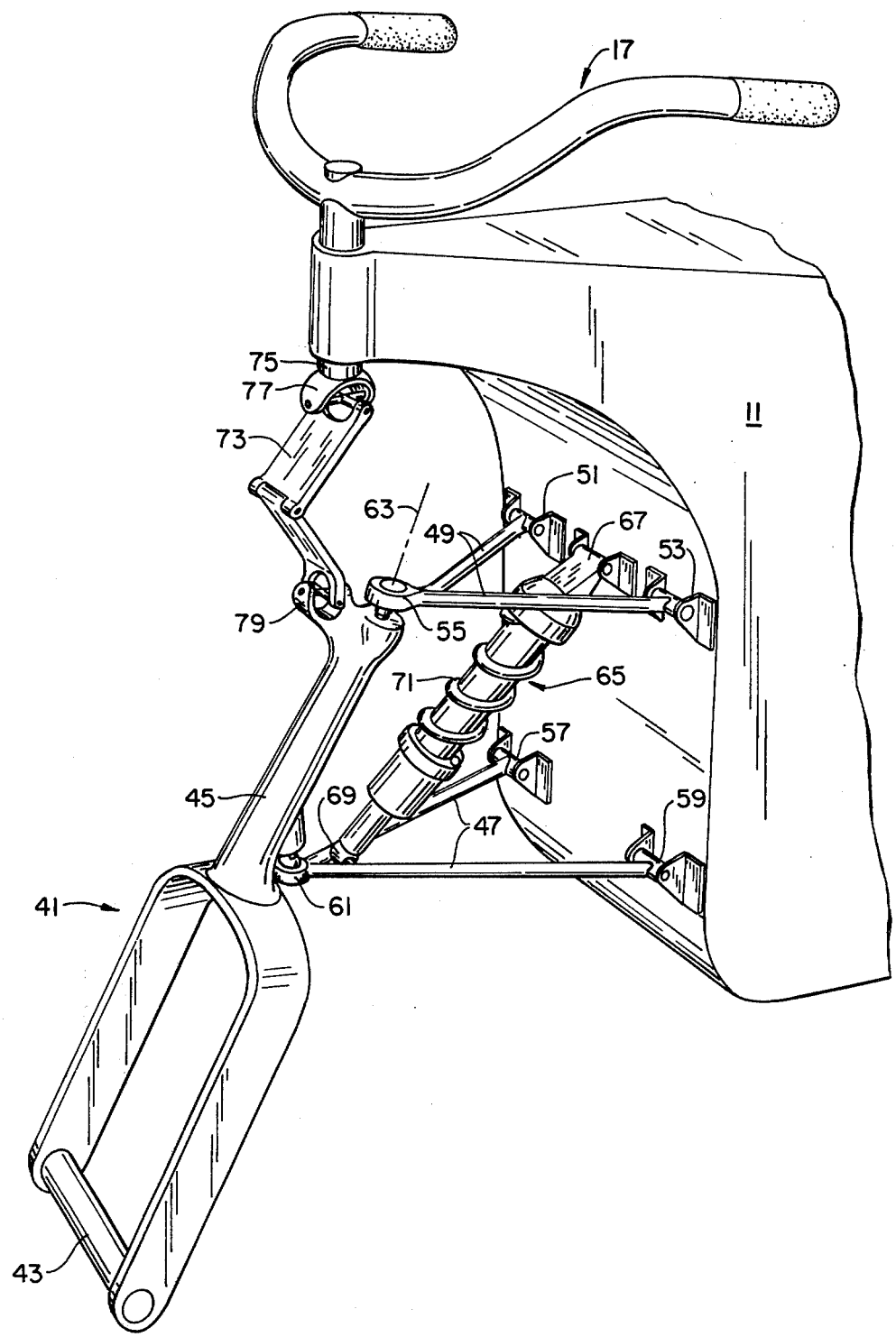
FIG._2.

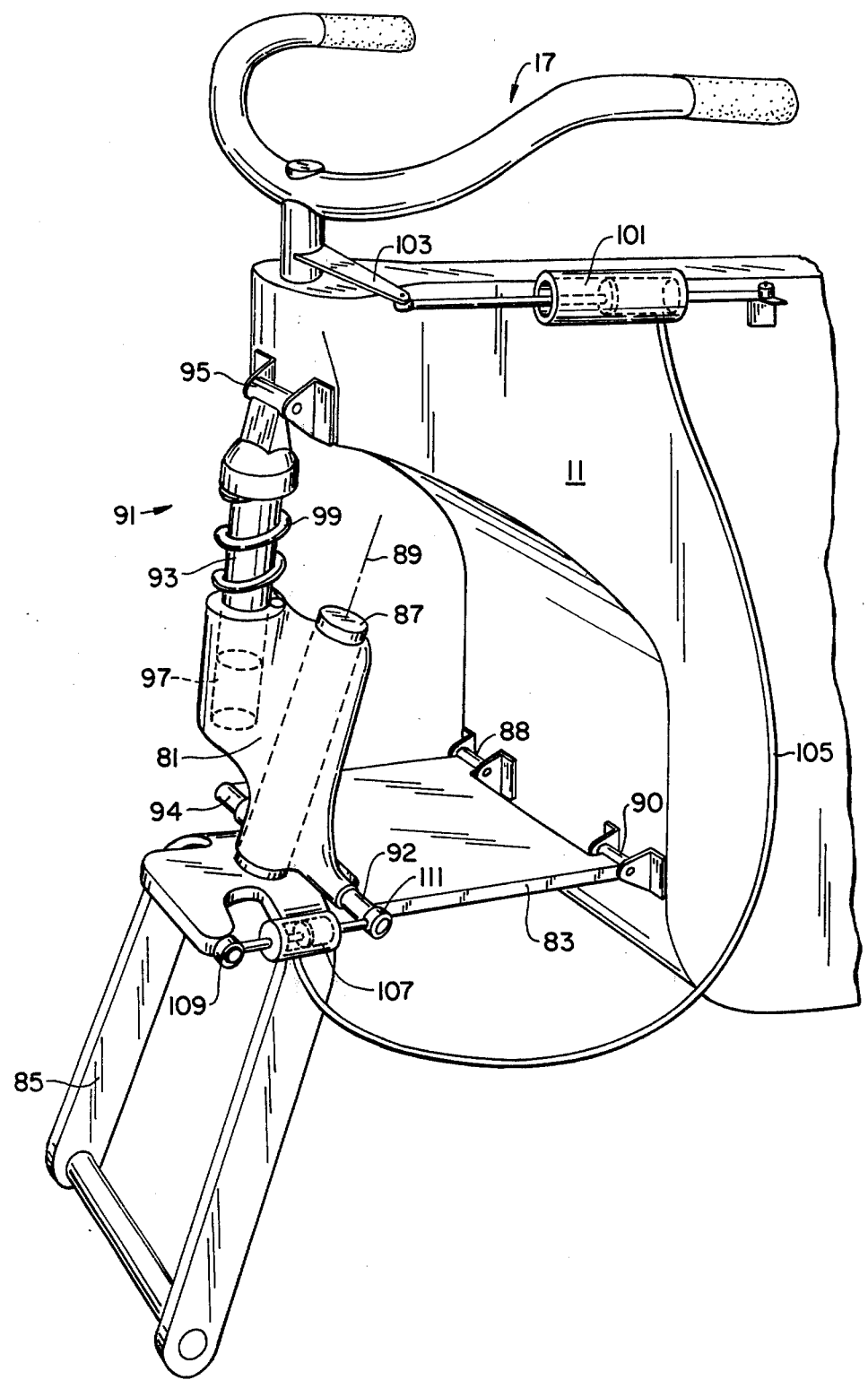
FIG._3.

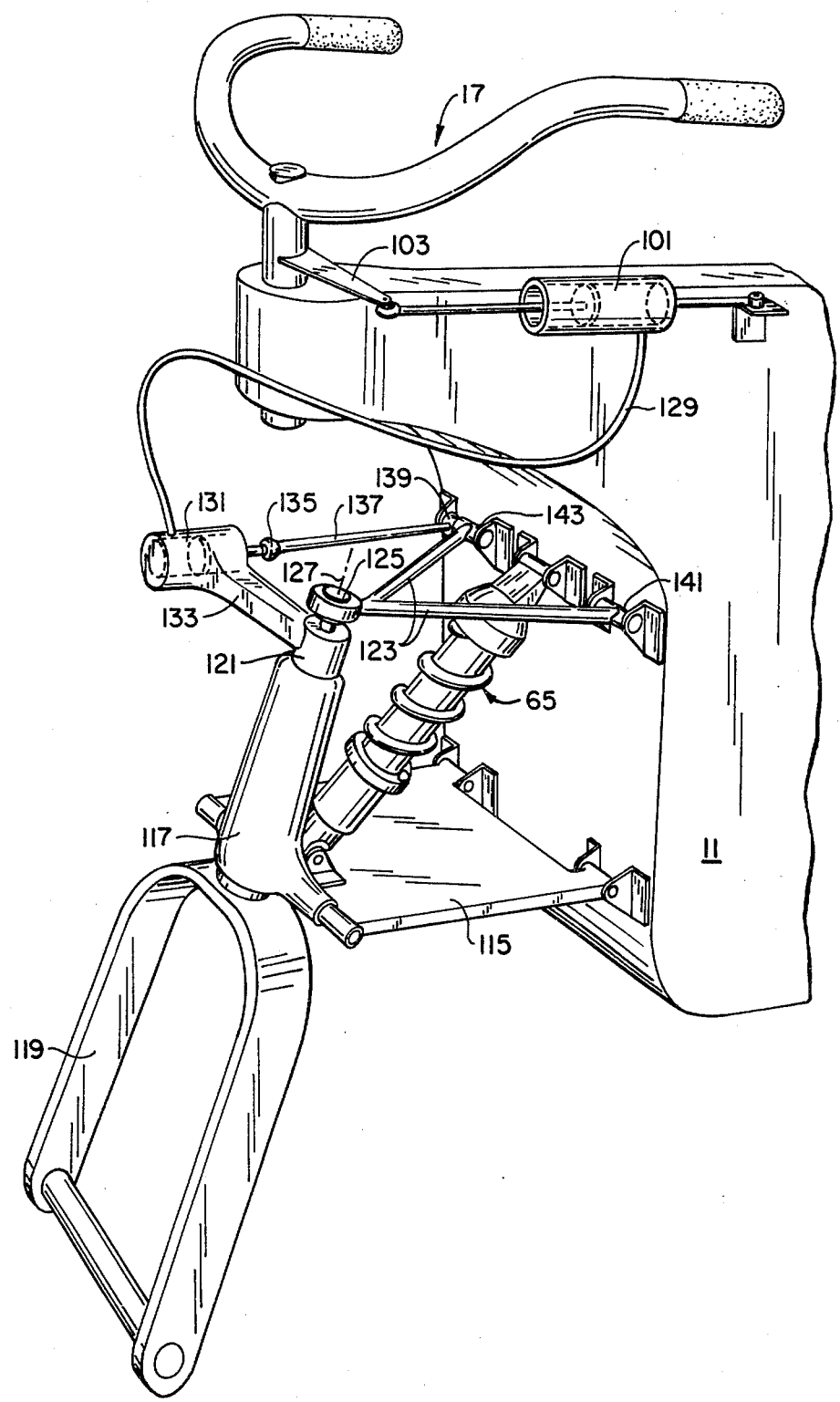
FIG._4.

MOTORCYCLE FRONT WHEEL SUSPENSION SYSTEM

BACKGROUND OF THE INVENTION

This invention relates generally to the art of vehicle suspension systems, and more particularly to an improved front wheel suspension mechanism for motorcycles and the like.

Many motorcycle and bicycle front wheel suspension systems have been proposed in the literature and adopted in use. However, for 30 years the principle motorcycle products sold in the world have had the same basic front wheel suspension system of telescoping front forks. Although some limitations of this system have been recognized in general terms, no improvements over it have come forth. Its limitations include front end dive upon applying a front wheel brake and heavy weight because it is structurally inefficient.

Therefore, in order to provide motorcycle handling characteristics by improving the front wheel suspension system, the present invention has the following as its principal objects:

1. To provide a suspension system that permits the direction of wheel movement upon hitting a bump to be set independent of the front wheel rake and trail, including a particular direction that minimizes motorcycle front end dive due to application of the front wheel brake;
2. To provide a suspension system that permits trail to be independently set;
3. To provide a design that minimizes instability and maintains a more constant force feedback to the rider through the handlebars, even when the motorcycle strikes bumps;
4. To minimize structural weight and bulk by providing a suspension linkage that efficiently transmits forces from the axle to the frame;
5. To provide a comfortable, soft ride and also be good for racing and other hard use; and
6. To provide a simplified and reliable mechanism for the front wheel suspension which accomplishes the above objects.

SUMMARY OF THE INVENTION

These and additional objects are accomplished by a front wheel suspension mechanism that moves the fork in a manner that the fork's steering axis orientation with respect to the frame does not change substantially. The suspension system connects to the fork only at its top, above the front wheel. Rotation of the fork about its steering axis is due solely to actuation by a steering linkage operated by movement of a handlebar pivotably mounted to the frame. The front suspension operates independently of the rear suspension and its movement is accommodated by the steering linkage. In a preferred form the suspension system for the front wheel assembly utilizes two A-arm members extending between the frame and the fork assembly.

Additional aspects and features of the present invention, as well as other objects and advantages thereof, will become apparent from the following detailed description of its preferred embodiments.

BRIEF DESCRIPTION OF THE DRAWINGS

FIG. 1 is a schematic illustration of the side view of a motorcycle and illustrating the principles of operation of the present invention;

FIG. 2 illustrates a preferred embodiment of the essential elements of a front wheel suspension system according to the present invention;

FIG. 3 shows another embodiment of the front wheel suspension system according to the present invention; and FIG. 4 shows yet a further embodiment of the front wheel suspension system according to the present invention.

DESCRIPTION OF THE PREFERRED EMBODIMENTS

Referring to FIG. 1, a schematic illustration of the side view of a two wheeled motorcycle is shown for the purpose of explaining the improved front wheel motion that results according to the present invention when the motorcycle hits a bump. It will be understood, however, that the principles of this invention have application to any vehicle wherein a single front wheel is steered by a handlebar or steering wheel. Besides motorcycles, the techniques of the present invention have application to bicycles, and to vehicles having two rear wheels with a single steered front wheel.

The basic motorcycle of FIG. 1 includes a frame 11, a front wheel 13, and a rear wheel 15. A fork 41 rigidly carries the front wheel axle 35. A handlebar 17 is pivotably attached to the front portion of the frame 11. A steering linkage (not shown) connects the handlebar 17 to the fork 41, causing movement of the handlebar 17 to rotate the fork 41 about a steering axis 21. The steering axis 21 never moves with respect to the fork 41. A steering head 19 is supported by the frame 11 through a suspension linkage 23. The fork 41 either pivotably connects to the steering head 19, said pivot defining the steering axis 21, or the connection is rigid. As is conventional on present motorcycles, a front wheel brake 25 is provided. Subsequent references to the "fork assembly" will mean the unit composed of the fork 41, and steering head 19. Embodiments of the steering head 19, suspension linkage 23, and the steering linkage are described in detail hereinafter with respect to FIGS. 2-4.

The linkage system 23 permits controlled movement of the front wheel assembly with respect to the frame 11 when a bump is hit, as shown in dotted outline in FIG. 1. This movement is independent of any movement of the rear wheel 15 since the rear wheel is carried by its own independent suspension system 27.

In order to maintain constant the steering force that the rider feels against the handlebars 17 when the front wheel assembly moves, the "rake" and "trail" should not change. This makes it easier for the rider to control the motorcycle and maintain stability. The "rake" is the inclination from vertical of the steering axis 21. The "trail" is the distance between a point 31 wherein the wheel 13 contacts the surface 29 and a point 31 which is the intersection of the steering axis 21 with the surface 29. The rake and trail do not vary with suspension movement when the suspension linkage 23 is properly configured so it moves the steering head 19 in a manner that the orientation of the steering axis 21 with respect to the frame 11 does not change. That is, when the steering axis 21 moves, it always moves parallel to itself.

If the linkage system 23 is designed to cause the axle 26 to move vertically, which is the case shown in FIG. 1, then the system has the further advantage of eliminating the front end dive caused by braking forces exerted by the front brake 25. However, the techniques described herein and methods of implementation are general enough to permit almost any particular wheel movement upon proper design of the linkage system 23, while still maintaining constant rake and trail. This gives a designer tremendous freedom.

The fork assembly and front wheel 13 are supported by the suspension linkage 23 only at the top of the fork assembly, at a position outside the circumference of the wheel 13 when viewed from the side. No suspension arms cross the wheel 13 and there is no need for any direct linkage between the axle 35 and the frame 11. This simplifies the suspension system, makes the motorcycle handle more easily and reduces the size of the suspension system.

Referring to FIG. 2, a preferred embodiment of a suspension linkage system and associated components is illustrated for carrying out the principles described with respect to FIG. 1. A fork 41 with a front wheel axle 43 at one end has a steering head 45 as an integral part of it at the other end. The fork assembly 41 is attached to the frame 11 through a linkage system that includes two sets of "A" arms 47 and 49, so called because they form the shape of an "A" in plan view. Arm 49 is pivotally attached to the frame 11 by pivots 51 and 53 lying on a common axis. At its other end, the A-arm 49 is attached to the top of the fork assembly 41 with a ball joint 55. The A-arm 47 is similarly attached, being pivotally mounted to the frame 11 by pivots 57 and 59 lying on a common axis, while being attached on its other end to the fork assembly 41 with a ball joint 61. The ball joints 55 and 61 permit steering rotations of the fork assembly 41 about the steering axis 63 as well as permitting the movement of the fork assembly 41 with respect to the frame 11 that has been described earlier with regards to FIG. 1.

The suspension linkage system shown in FIG. 2 has two structural advantages: the load path from the axle 43 to the frame 11 is as short as possible, and the A-arms 47 and 49 act in pure tension and compression to resist front wheel reactions. Only the fork acts in bending, thus the whole mechanism can be made very stiff with a minimum of structural weight. Additionally, there is a low moment of inertia about the steering axis because the suspension linkage does not rotate. A low moment of inertia improves steering stability.

The fork assembly 41 is held away from the frame 11 by a spring 71 that is mounted to the frame 11 at one end through a pivot 67. The other end of the spring 71 is pivotably mounted to the lower A-arm 47 at 69. The spring 71 is held in compression and gives a downward force to the fork assembly 41. The weight of the motorcycle and rider act to compress this spring. Similarly, bumps encountered will cause the spring 71 to momentarily compress further.

A folding bar 73 provides a steering linkage between the handlebars 17 and the fork assembly 41. The folding bar 73 is joined at one end to a handlebar shaft 75 by a U-joint 77 that has two degrees of rotational freedom. Similarly, the other end of the folding bar linkage 73 connects to the fork assembly 41 with another U-joint 79. The resulting linkage causes motion of the handlebar 17 to rotate the fork assembly 41 about its steering axis 63, while at the same time permitting the fork assembly 41 to move with respect to the frame 11 without further rotation of the fork assembly 41 about its steering axis 21. Other linkages can be utilized, such as one with a spline shaft used in place of the folding bar 73, so long as the various degrees of freedom as described herein are provided.

Referring to FIG. 3, different types of handlebar linkage and suspension linkage are illustrated. The suspension linkage is composed of a sliding post 93 attached to a pivot 95 mounted on the frame 11, and a rigid link 83 which pivots on frame 11 mounted hinges 88 and 90. The other end of the rigid link 83 is pivotally attached to the steering head 81 by connections 92 and 94 while the post 93 slidably mates in an opening 97 of the steering head 81. The axes of pivots 95, 88, 90, 92 and 94 are all parallel, and the post 93 is oriented perpendicular to these axes. A spring 99 reacts between the frame 11 and steering head 81, countering the weight of the motorcycle and rider.

The fork 85 has a cylindrical boss 87 that rotatably connects to the steering head 81. The axis of this rotation is the steering axis 89 and it is coincident with the axis of the cylindrical boss 87.

A hydraulic steering linkage is employed in FIG. 3. A hydraulic master cylinder 101 has a piston mechanically connected to a lever 103 that moves with rotation of the handlebar 17. Hydraulic fluid is transferred through a line 105 to a slave hydraulic cylinder 107. The ends of this cylinder 107 make ball joint connections to the fork 109 and rigid link 111. Because ball joint connection 111 lies on the axis of pivots 92 and 94, suspension movement and steering rotations about the steering axis 89 act independently of each other.

Referring to FIG. 4, a different specific embodiment of a hydraulic steering linkage is illustrated in combination with yet another steering head linkage system. Referring to the steering head linkage system first, a rigid link 115 is pivotally mounted at one end to the frame 11 and at the other end to a steering head 117 as was discussed in reference to FIG. 3. A cylindrical boss 121, which is part of the fork 119, rotatably connects to the steering head 117. One end of an "A" arm 123 is pivotally mounted to the frame 11 at 141 and 143 and its other end is joined to the top of the fork boss 121 by a ball joint 125. The steering axis 127 is coincident with the axis of the cylindrical boss 121 and ball joint 125. A spring 65 is utilized in the embodiment of FIG. 4 similar to that described hereinbefore with respect to FIG. 2.

For the steering linkage in the system of FIG. 4, the same master cylinder 101 and lever 103 as exists in the system of FIG. 3 is employed. A hydraulic fluid hose 129 connects the master cylinder 101 to the slave cylinder 131. The slave cylinder 131 is solidly attached to the boss 121 of the fork 119. A reaction strut 137 is connected by spherical joints to the slave cylinder 131 and frame 11. Spherical joint 139 lies on the axis of pivots 141 and 143, while spherical joint 135 lies on a line passing through ball joint 125 which is parallel to the axis of pivots 141 and 143. Fork rotation about the steering axis 127 is independent of suspension movement with this reaction strut geometry.

The rigid links of FIGS. 3 and 4 provide an efficient load path to the frame 11. Longitudinal forces on the steering head pivots cause only tension and compression in the rigid link 115, while transverse forces on the steering head pivots cause a shear in the plane of the plate-like rigid link 115. Front wheel forces do not cause bending or torsion in the rigid link 115, hence it carries these loads with minimal flexing and stress. Additionally, there is a low moment of inertia about the steering axis 137 because the suspension linkage does not rotate with steering movement.

Although several preferred embodiments of a motorcycle suspension system embodying the various aspects of the present invention have been described, it will be understood that there are certain variations thereof which do not depart from the essence of the invention, and thus that the invention is entitled to protection within the full scope of the appended claims. For example, it will be understood that the handlebar linkage system of the embodiment of FIG. 2 can be utilized with the steering head linkage system of the embodiments of either of FIG. 3 or FIG. 4. Similarly, a hydraulic steering linkage system could be used with the steering head linkage system of FIG. 2. Other various combinations and variations will become apparent from the foregoing description as well.

I claim:

1. In a vehicle having a passenger carrying frame, front and rear wheels and steering handlebars pivotably mounted on said frame for rotating a front wheel fork about a steering axis defined with respect to said fork, the improvement comprising means connecting said fork at a position only above the front wheel to said frame for constraining the fork to move relative to said frame with its steering axis movable substantially parallel to itself, such fork movement occurring in response to the front wheel encountering bumps and independent of any rear wheel motion with respect to the vehicle frame.

2. The improved vehicle front wheel assembly of claim 1 wherein said fork attaching means additionally comprises means for constraining said front wheel assembly to move substantially vertically with respect to said frame.

3. The improved vehicle front wheel assembly according to claim 1 which additionally comprises a linkage connected between said fork and said handlebars, said linkage characterized by transmitting rotations therebetween but permitting said movement of the front wheel assembly with respect to said frame without moving said handlebars.

4. In a motorcycle having a passenger carrying frame with front and rear wheels independently suspended on said frame, a front wheel assembly comprising:
   a fork assembly including a fork having a front wheel axle held rigidly thereby at one end,
   a front wheel suspension system characterized by means attaching said fork assembly only above its front wheel to said frame in a manner allowing rotation of said fork about a steering axis fixed with respect to the fork assembly, said suspension system permitting upward movement of the fork assembly relative to the frame in a manner that the steering axis maintains substantially a constant orientation with respect to said frame throughout such movement,
   a connection between said fork assembly and said frame for resiliently urging said fork assembly to one extreme position with respect to said frame, wherein the weight of the motorcycle and rider operate to move said fork assembly towards another extreme position,
   handlebars pivotably held by said frame at a front portion thereof, and
   a linkage causing rotation of said handlebars to rotate said fork assembly about said steering axis without impeding the motion of said fork assembly relative to said frame.

5. The motorcycle front wheel assembly according to claim 4 wherein said front wheel suspension system is further characterized by constraining the front wheel to move substantially only vertically.

6. The motorcycle front wheel assembly according to claim 4 wherein said fork assembly includes a steering head separate from the fork element but carrying the fork in a manner to be rotatable therewith, said steering axis being coincident with an axis of fork rotation with respect to said steering head, said steering head being held to said frame by a mechanical linkage.

7. The motorcycle front wheel assembly according to claim 4 wherein said axle is held by said fork a distance displaced from said steering axis.

8. The motorcycle front wheel assembly according to claim 4 wherein said front wheel suspension system comprises two arm members extending between said frame and said fork assembly, said members being pivotally mounted at each end thereof in a manner to permit the defined motion of said fork member.

9. The motorcycle front wheel assembly according to claim 8 wherein said arm members embody A-arms in plan view and rigid links.

10. The motorcycle front wheel assembly according to claim 8 wherein each of said arm members is connected directly to the fork of said assembly by ball joints, whereby the steering axis is defined by a line extending through both of said ball joints.

11. The motorcycle front wheel assembly according to claim 10 wherein each member is an A-arm in plan view, connected in a manner to resist front wheel forces by pure tension or compression.

12. In a motorcycle having a passenger carrying frame with front and rear wheels independently suspended on said frame, a motorcycle front wheel assembly comprising:
   a fork assembly including a fork having a front wheel axle held rigidly thereby at one end and a steering head separate from the fork element but carrying the fork in a manner to be rotatable therewith,
   a front wheel suspension system characterized by means attaching said fork assembly only above its front wheel at said steering head to said frame in a manner allowing rotation of said fork about a steering axis fixed with respect to the fork assembly, said steering axis being coincident with an axis of fork rotation with respect to said steering head, said suspension system permitting upward movement of the fork assembly relative to the frame in a manner that the steering axis maintains substantially a constant orientation with respect to said frame throughout such movement, said steering head being held to said frame by a single rigid substantially horizontal link pivotably mounted at either end to the steering head and to the frame, and a post pivotably mounted at one end of said frame and at the other end slidably engaging said steering head,
   a connection between said fork assembly and said frame for resiliently urging said fork assembly to one extreme position with respect to said frame, wherein the weight of the motorcycle and rider operate to move said fork assembly towards another extreme position, handlebars pivotably held by said frame at a front portion thereof, and a linkage causing rotation of said handlebars to rotate said fork assembly about said steering axis without impeding the motion of said fork assembly relative to said frame.

13. In a motorcycle having a passenger carrying frame with front and rear wheels independently suspended on said frame, a front wheel assembly comprising:

a fork assembly including a fork having a front wheel axle held rigidly thereby at one end, a front wheel suspension system characterized by means attaching said fork assembly only above its front wheel to said frame in a manner allowing rotation of said fork about a steering axis fixed with respect to the fork assembly, said suspension system permitting upward movement of the fork assembly relative to the frame in a manner that the steering axis maintains substantially a constant orientation with respect to said frame throughout such movement, a connection between said fork assembly and said frame for resiliently urging said fork assembly to one extreme position with respect to said frame, wherein the weight of the motorcycle and rider operate to move said fork assembly towards another extreme position, handlebars pivotably held by said frame at a front portion thereof, and a linkage causing rotation of said handlebars to rotate said fork assembly about said steering axis without impeding the motion of said fork assembly relative to said frame, said linkage between the handlebars and the fork comprising a folding bar connected therebetween with U-joints at either end.

14. In a motorcycle having a passenger carrying frame with front and rear wheels independently suspended on said frame, a front wheel assembly comprising:

a fork assembly including a fork having a front wheel axle held rigidly thereby at one end, a front wheel suspension system characterized by means attaching said fork assembly only above its front wheel to said frame in a manner allowing rotation of said fork about a steering axis fixed with respect to the fork assembly, said suspension system permitting upward movement of the fork assembly relative to the frame in a manner that the steering axis maintains substantially a constant orientation with respect to said frame throughout such movement, a connection between said fork assembly and said frame for resiliently urging said fork assembly to one extreme position with respect to said frame, wherein the weight of the motorcycle and rider operate to move said fork assembly towards another extreme position, handlebars pivotably held by said frame at a front portion thereof, and a linkage causing rotation of said handlebars to rotate said fork assembly about said steering axis without impeding the motion of said fork assembly relative to said frame, said linkage comprising:

a hydraulic master cylinder mechanically driven upon rotation of said handlebars;

a slave hydraulic cylinder provided on said fork assembly and in hydraulic communication with said master cylinder;

a reaction strut, which may also be a suspension link, with ends connected to the frame and said slave cylinder in a manner that said forks rotate about said steering axis only in response to slave cylinder actuation.

* * * * *